US006773800B2

(12) United States Patent
Hosoe et al.

(10) Patent No.: US 6,773,800 B2
(45) Date of Patent: Aug. 10, 2004

(54) ELECTROMAGNETIC WAVE ABSORBENT AND METHOD FOR PRODUCING MAGNETIC POWDER FOR THE SAME

(75) Inventors: Akihisa Hosoe, Osaka (JP); Koji Nitta, Osaka (JP); Shinji Inazawa, Osaka (JP); Katsumi Okayama, Tokyo (JP); Junichi Toyoda, Tokyo (JP)

(73) Assignees: Sumitomo Electric Industries, Ltd., Osaka (JP); Sony Corporation, Tokyo (JP)

( * ) Notice: Subject to any disclaimer, the term of this patent is extended or adjusted under 35 U.S.C. 154(b) by 0 days.

(21) Appl. No.: 10/073,270

(22) Filed: Feb. 13, 2002

(65) Prior Publication Data

US 2003/0010408 A1 Jan. 16, 2003

(30) Foreign Application Priority Data

Feb. 15, 2001 (JP) ....................................... 2001-038974
Dec. 10, 2001 (JP) ....................................... 2001-375991

(51) Int. Cl.[7] .................................................. G11B 5/66
(52) U.S. Cl. ....................... 428/323; 428/328; 428/403; 428/407; 428/634 B
(58) Field of Search ...................... 428/634 B, 634 BA, 428/323, 328, 324, 403, 407, 694 B; 427/212, 221, 222

(56) References Cited

U.S. PATENT DOCUMENTS 4,088,544 A 5/1978 Hutkin
6,262,513 B1 * 7/2001 Furukawa et al. ....... 310/313 R
6,540,043 B2 * 4/2003 Will ........................... 180/404
6,628,043 B2 * 9/2003 Furukawa et al. ...... 310/313 R

FOREIGN PATENT DOCUMENTS

| | | | | |
|---|---|---|---|---|
| EP | 08-074072 | | | 3/1996 |
| EP | 0859378 | A1 | * | 8/1998 |
| EP | 0859378 | A1 | | 8/1998 |
| EP | 0884739 | A1 | | 12/1998 |
| EP | 0884739 | A1 | * | 12/1998 |
| EP | 1124282 | A2 | | 8/2001 |
| JP | 2000068117 | | * | 3/2000 |
| JP | 2000-068117 | | | 3/2000 |
| JP | 2000244176 | | * | 3/2000 |
| JP | 2000-244176 | | | 9/2000 |
| JP | 2001-60790 | | | 3/2001 |

* cited by examiner

*Primary Examiner*—Leszek B Kiliman
(74) *Attorney, Agent, or Firm*—McDermott Will & Emery LLP

(57) ABSTRACT

A magnetic powder 4 is produced by use of a plating mold M which is pattern-formed with an electrode range 10 corresponding to the shape of a magnetic powder 4 and an insulative range surrounding the periphery of the electrode range, precipitating films 40 of the magnetic material selectively in the electrode range through an electroplating and then peeling the films 40 from the plating mold. The flat magnetic powders 4 where are regular in piano shapes and diameters among or between powders or where average crystal grain diameters are 100 nm or smaller, are much dispersed into an insulative resin as a bonding agent.

24 Claims, 3 Drawing Sheets

ELECTROMAGNETIC WAVE ABSORBENT AND METHOD FOR PRODUCING MAGNETIC POWDER FOR THE SAME

BACKGROUND OF THE INVENTION

The invention relates to an electromagnetic wave absorbent wherein magnetic powders are dispersed in an insulative resin as a bonding agent, and a method for producing magnetic powders for the electromagnetic wave absorbent.

For making functions of electronic machinery or communication apparatus stable, the electromagnetic wave absorbent is used in order to absorb electric waves to be external disturbance outside of the apparatus or electric waves escaping from the interior thereof for preventing noises or hindrance of electric waves.

Related art electromagnetic wave absorbents include irregular magnetic powders such as spinel or hexagonal ferrite sintered substances, which are dispersed in an insulative resin as a bonding agent.

Main applications for the electromagnetic wave absorbent include mobile communication machinery and other devices using a frequency band from para-microwave to microwave, such as portable telephones or PHS (personal handy-phone system) or casings of machinery.

In the electromagnetic wave absorbent, material parameters based on the electromagnetic wave absorbing properties have a complex dielectric constant and a complex permeability in a high frequency, and in the electromagnetic wave absorbent using the magnetic powders, a magnetic loss portion $\mu''$ being an imaginary number component of the complex permeability $\mu=\mu'-j\mu''$ plays a role in the electromagnetic wave absorbing properties.

The spinel ferrite based material has in general the complex permeability as shown in FIG. 4A. That is, when a frequency f increases a certain value, a real number $\mu'$ of the permeability $\mu$ having been almost constant at that time rapidly goes down, and $\mu''$ takes a maximal value in a resonance frequency fr being a higher frequency zone than $\mu'$. The larger the maximal value of this $\mu''$ is, the larger the energy loss generates, and the good electromagnetic absorbing properties are shown.

However, as seen in FIG. 4B, the higher resonance frequency (ferrite A<ferrite B<ferrite C) the spinel ferrite based material has, the smaller maximal value $\mu''$ has. Therefore, a high permeability cannot be obtained in the high frequency particularly in such as a GHz zone, and therefore a good electromagnetic wave absorbing effect cannot be expected.

This is called as "snoek's critical line" shown with a two-dotted line in the same, and a product of the resonance frequency and the permeability is constant in a formula (1).

[Formula 1:]

$$fr = \frac{\gamma}{3\pi\mu_0} Is \tag{1}$$

(In the formula, fr is a resonance frequency, $\mu'$ is a real number, $\gamma$ is gyromagnetic constant, $\mu_0$ is a permeability of vacuum, and Is is saturation magnetization.)

In contrast, since the hexagonal ferrite sintered substance has a small magnetic anisotropy of an in-plane, the permeability is large. Moreover, the anisotropic energy is large to direct magnetization in a plane-orthogonal direction. Therefore, the resonance occurs at a higher frequency than that of the spinel ferrite sintered substance.

Namely, in the hexagonal ferrite sintered substance, the product of the resonance frequency and the permeability is expressed with a formula (2).

[Formula 2]:

$$fr(\mu'-1) = \frac{\gamma Is}{3\pi\mu_0}\sqrt{\frac{H_{A2}}{H_{A1}}} \tag{2}$$

(In the formula, fr is resonance frequency, $\mu'$ is real number, $\gamma$ is gyromagnetic constant, $\mu_0$ is permeability of vacuum, Is is saturation magnetization, $HA_1$ is the magnetic anisotropy for directing the magnetic moment in the in-plane direction, and $HA_2$ is the magnetic anisotropy for directing the magnetic moment in the plane-orthogonal direction.) Since $HA_2/HA_1$ in the formula is 1 or more, the high permeability can be maintained until a high frequency band exceeding "snoek's critical line".

However, the saturation magnetization of the hexagonal ferrite is around 0.5 T, and so the above-mentioned effect has been limited.

Therefore, the magnetic powders, which comprise a metallic soft magnetic material being a thickness around "skin depth" and being a flat shape of an aspect ratio (diameter/thickness) being 10 or higher, have been recognized as a material having a large magnetic loss portion $\mu''$, which show a good electromagnetic wave absorption.

The thickness of "skin depth" is expressed with a formula (3).

[Formula 3:]

$$(\text{skin depth}) = \sqrt{\frac{\rho}{\pi f \mu}} \tag{3}$$

(p: electric resistivity, $\mu$: magnetic permeability, f: frequency).

However, even if flat magnetic powders are used, the electromagnetic wave absorbent having an enough absorption effect is not always obtained in the present situation.

Therefore, in the related art, the demand for the high electromagnetic wave absorbing effect has been satisfied by increasing the rate of magnetic powders in the electromagnetic wave absorbent. However, the known electromagnetic wave absorbent has not complied with the recent demands for more intensively absorbing the electromagnetic wave in specific frequency bands depending on a further advanced higher output of the machinery.

As the ratio of the magnetic powders in the electromagnetic wave absorbent is increased, the ratio of the resin as the bonding agent is relatively less. The electromagnetic wave absorbent makes strength or formability less owing to the relative decrease of the ratio of the resin. Therefore, the increasing method of the rate of the magnetic powders has been limited.

For solving the above-mentioned problems, inventors carried out analyses on shapes and structure of magnetic powder, and found the following facts.

The present flat magnetic powders are generally produced by subjecting spherical raw powders made by, e.g., an atomizing process to mechanically breaking, elongating and tearing processes with a ball mill. In this method, even if the spherical raw powders are regulated almost in a uniform size, large dispersions occur in the sizes or shapes of produced magnetic powders, since strength to be loaded on the raw powders in subsequent breaking, elongating and tearing processes is different per each of powders. Therefore, the magnetic powders especially have large dispersions of plane shapes and thickness as to respective magnetic powders. Further, even though the sizes of the magnetic powders are classified and regulated in a certain range, dispersions of the plane shape and the thickness are large and the thickness of any portion of each magnetic powders are irregular. Therefore, the frequency properties are standardized between the magnetic powders, if the dispersions are large. In other words the frequency property does not have an acute peak of a specific frequency, but has a broad distribution over a wide frequency band. Therefore, the absorption effect of the magnetic powders is lowered in the specific frequency. Further, when the magnetic powders are dispersed into the resin, a waste of space occurs due to their irregularity in shape. Therefore, the known magnetic powders cannot obtain a high electromagnetic wave absorbing effect.

When the structure of the magnetic powders is considered, Ni—Fe alloy shows a most excellent soft magnetic property among metallic soft magnetic materials. This alloy exhibits the highest soft magnetic property when it is of a solid solution under a non-equilibrium condition at room temperatures. However, as in Ni—Fe alloy, an intermetallic compound $Ni_3Fe$ having the low soft magnetic property is under an equilibrium condition at room temperatures, the related art of the flat magnetic powder subjected to dissolution and cooling processes has a structure including the intermetallic compound. Therefore, from this structure, the high electromagnetic wave absorbing effect cannot be provided, either.

On the other hand, for solving the above-mentioned problems, it is proposed in JP-A-2001-60790 to use disc like magnetic powders having circular planes and uniform thickness. Detailed theory is described in the publication, but in generally the disc like magnetic powder comprising a metallic soft magnetic material, the ratio of $HA_2/HA_1$ is larger than the existing cases, where $HA_1$ is the magnetic anisotropy for directing the magnetic moment in the in-plane direction, and $HA_1$ is the magnetic anisotropy for directing the magnetic moment in the plane-orthogonal direction. Besides, the saturation magnetization of the metallic soft magnetic material is considerably higher than that of the hexagonal ferrite. Accordingly, it is presupposed that the disk like magnetic powder shows a higher permeability frequency zone than that of the present.

However, as described in the publication, ball-like raw powders formed by a water atomizing process are subjected to mechanically breaking, elongating and tearing processes into the magnetic powders in a flat shape by means of a ball mill, and although the ball-like raw powders are regulated almost uniformly in powder size, since strength to be loaded on the raw powders in subsequent breaking, elongating and tearing processes is different per each of the raw powders, large dispersions occur in the sizes or shapes of produced magnetic powders.

So, though classifying and regulating sizes in certain ranges, the magnetic powders especially have large dispersions of plane shapes and thickness as to respective powders, and besides they are irregular even inside of the same powders. If dispersions are large, frequency properties are standardized between or among powders. Namely, the frequency property does not have an acute peak with respect to specific frequencies, but has a broad distribution over a wide frequency zone and the absorption effect is lowered with respect to the specific frequencies. Further, being irregular in shape, when the magnetic powders are dispersed into a resin, their use is questionable in view of space consideration. Therefore, the known flat magnetic powder cannot obtain a high electromagnetic wave absorbing effect.

In view of the structure of the magnetic powders, a Ni—Fe alloy called as permalloy shows a most excellent soft magnetic property among metallic soft magnetic materials. This alloy exhibits a highest property when it is of a solid solution under a non-equilibrium condition at room temperatures. But in the Ni—Fe alloy, since an intermetallic compound having the low soft magnetic property being $Ni_3Fe$ is present under an equilibrium condition at room temperatures, the conventional magnetic powder having passed through a dissolution and a cooling has a structure including such an intermetallic compound. Therefore, seeing in the structure, the high electromagnetic wave absorbing effect cannot be provided, either.

In the above publication, studies have been made on a method of punching or etching magnetic film formed into desired dimensions or shapes by a vapor-phase growth process, such as a vacuum evaporation or a spattering process. Depending on the method, it is assumed that the magnetic powder having the plane shape regulated between respective powders and having the uniform thickness between respective magnetic powders and within one magnetic powder, may be produced.

However, seeing the magnetic powder from the structure, a processed structure remains in the magnetic powder, if the magnetic powder is punched. A corrosion structure remains in the magnetic powder, if the magnetic powder is etched. With this, the structure is disordered within the magnetic powders and the soft magnetic property goes down. Therefore, the high electromagnetic wave absorbing effect cannot be obtained.

If the film of the magnetic material is in advance pattern-formed by a vapor-phase growth process using a mask pattern, the problem of disorder in the structure is solved.

However, the thus pattern-formed film shows a tendency to be larger in thickness as going to a center and smaller as approaching a circumference near the mask pattern. Therefore, the thickness is irregular in the respective magnetic powders, and the electromagnetic wave absorbing effect goes down.

Further, the film formed through the vapor-phase growth process is difficult to separate from a mold. Thus, the film is easily deformed or damaged owing to stress when separating. Further, if dust by deformation or damage, which causes dispersions in the frequency property, are mixed into the powder, the absorbing effect for the electromagnetic wave of the specific frequency decreases more.

Moreover, a yield of the produced magnetic powder is around 30% of the used raw material in any cases when punching or etching the film formed through the vapor-phase growth process or when pattern-forming by use of the mask pattern. Further, an initial cost of an apparatus used in the vapor-phase growth process is considerably expensive. Therefore, there is a problem that a production cost including the initial cost is high.

SUMMARY OF THE INVENTION

It is an object of the invention to provide an electromagnetic wave absorbent, which includes magnetic powders showing the high permeability in the high frequency band such as the GHz zone, has an excellent effect in selectively, effectively and intensively absorbing an electromagnetic wave in specific frequency bands, and a method for producing magnetic powders for the electromagnetic wave absorbent.

The inventors made further investigations on the magnetic powders. As a result, they found that the magnetic powder should be produced by precipitating a magnetic film selectively in an electrode range by electroplating using a plating mold pattern-formed with the electrode range corresponding to the shape of the magnetic powder and an insulative range surrounding the periphery of the electrode range, and by peeling the film of magnetic material precipitated by the electroplating. Thus the inventors have accomplished the invention.

That is, the above-mentioned object can be achieved by an electromagnetic wave absorbent comprising: an insulative resin as a bonding agent; and a plurality of magnetic powders dispersed into the insulative resin, the magnetic powder being regular in the plane shape between the respective powders and being regular in thickness between the respective powders and within one magnetic powder.

The magnetic powder is produced by preparing a plating mold pattern-formed with an electrode range corresponding to the shape of the magnetic powder and an insulative range surrounding the periphery of the electrode range, precipitating a magnetic film, which has a plane shape corresponding to the shape of the magnetic powder, selectively in the electrode range through an electroplating with the plating mold while the electrode range being as a cathode, and by peeling the film from the plating mold.

The magnetic powder used in the electromagnetic wave absorbent according to the invention is made regular in the plane shape between powders in such a manner that the magnetic powder is formed in the plane shape in response to the shape of the electrode range of the plating mold by means of the electroplating as mentioned above. For instance, an area of the plane shape can be regulated in a range of±10% dispersion between powders. The plane shape of the magnetic powder is not limited to a specific shape. Preferably, the shapes are such as a circle or an ellipse without having corners, because these shapes limit influences of diamagnetism by a magnetization distribution to a minimum, and restrain dispersion of magnetic resonance frequency by shape anisotropy.

Further, depending on the electroplating, the film of magnetic material is precipitated on the electrode range in an almost uniform thickness. Moreover, in the electroplating, the thickness of the film of magnetic material can be strictly controlled to be a predetermined thickness by adjusting conditions as an electric current passing time, a current density and others. Therefore, it is possible with the method of the present invention to regulate the thickness of each magnetic powder within a range of±15% of the predetermined thickness. Likewise, it is possible to regulate the thickness of any portion of each magnetic powders within a range of±10% of the predetermine thickness. This regulation is made possible by the electroplating process employed by the present invention.

The film formed by the electroplating can be easily peeled from the plating mold in comparison with the vapor-phase growth process. Therefore, it is more difficult to deform and damage the film. With this, the magnetic powder can have the frequency property having an acute peak of the specific frequency, and when dispersing the magnetic powder into the resin, no waste of space occurs.

On the other hand, seeing from the structure, the film of magnetic material formed by the electroplating presents a state of the solid solution showing the highest soft magnetic property as mentioned above, if it is Ni—Fe alloy. Besides, as it is previously pattern-formed, the structure is not disordered by punching or etching.

Accordingly, the electromagnetic wave absorbent of the invention using the magnetic powder, comparing with the related art, has an excellent effect in selectively, effectively and intensively absorbing electromagnetic waves in specific frequency band.

In order to heighten the permeability of the Ni—Fe alloy, Ni and Fe are the solid solution in the Ni—Fe alloy. Further, it is enumerated that the metallic structure has no lattice defect such as internal strain.

Therefore, the inventor made studies on thermal treatments of the magnetic powders produced by an electroplating for decreasing the lattice defect and accomplishing the higher permeability. Making experiments by varying temperature conditions of the thermal treatments, as a result, however, contrary to presumption, the higher temperatures the thermal treatments are performed, the lower the permeability becomes in the high frequency band.

It is found that when the thermal treatment is done at 300° C. or higher, crystal grains grow to be coarse. That is, the average crystal grain diameter of the metallic soft magnetic material forming the magnetic powder are 100 nm or smaller without doing the thermal treatment. When the metallic soft magnetic material is heated at 300° C. for 60 minutes, the crystal grain become coarsened until about 300 nm. When the metallic soft magnetic material is heated at 600° C. for 60 minutes, the crystal grain become coarsened until about 2800 nm.

From these facts, it is found that in the flat magnetic powder, the smaller the average crystal grain diameters of the metallic soft magnetic material are, the larger the magnetic loss portion $\mu''$ could be made.

Therefore, the inventor considers as follows. As shown in JP-A-2001-60790, if the $HA_2/HA_1$ has a large value, $\mu''$ becomes high in the high frequency band.

As $HA_2$ is determined owing to a shape of the magnetic powder, for more heightening $\mu''$ of the same shape in the high frequency band than the present state, it is sufficient to make small the magnetic anisotropy $HA_1$ when directing a magnetic moment in the in-plane.

In the case of the flat magnetic powder comprising the metallic soft magnetic material, the crystal grain is made fine to reduce the crystal grain diameter in order to make $HA_1$, i.e., the crystal magnetic anisotropy, small.

If the crystal grain is made fine, the volumetric percentage of the grain boundary, which is being disorder in crystal arrangement, is high.

Therefore, the crystal magnetic anisotropy is small as a whole, and $HA_2/HA_1$ has the larger value than the present, thereby to make $\mu''$ high in the high frequency band.

The inventor further studied the range of the average crystal grain diameter, and as a result, has found that the average crystal grain diameter is sufficiently 100 $\mu$m or lower.

Accordingly, the electromagnetic wave absorbent of the present invention includes an insulative material as a bonding agent, and magnetic powders, which are much dispersed into the insulative resin. The magnetic powders have an average crystal grain diameter of 100 nm or smaller.

If it is considered to change in heating histories of the magnetic powders, for example, when melting and mixing the magnetic powder and resins under heating for producing the electromagnetic wave absorbent, and when forming the produced electromagnetic wave absorbent into desired shapes through the heat-forming, an average value of the crystal grains diameter is defined as the average crystal grain diameter immediately after producing the electromagnetic wave absorbent dispersed with the magnetic powder in the resin.

DETAILED DESCRIPTION OF THE PREFERRED EMBODIMENTS

Figure 1A:
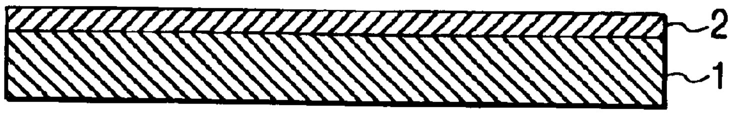
FIGS. 1A to 1F are cross sectional views respectively showing processes for making the plating mold, and producing the magnetic powder according to the invention by use of the plating mold.

Embodiments according to the invention are explained as follows.

[Magnetic Powder]

The magnetic powder used in the embodiments is produced by precipitating a magnetic film selectively in an electrode range through an electroplating using a plating mold, and by peeling the film of magnetic material from the plating mold. The plating mold is pattern-formed with the electrode range corresponding to the plane shape of the magnetic powder and the insulative range surrounding the periphery of the electrode range. Thus, the magnetic powder is regular in the plane shape between respective magnetic powders and regular in thickness between respective magnetic powders and within one powder. The magnetic powder also has the excellent property in structure as mentioned above.

As the magnetic material for forming the magnetic powder, there are various metallic soft magnetic materials capable of forming the film through the electroplating.

Ni—Fe alloy shows an excellent soft magnetic property among metallic soft magnetic materials, and is preferably used in the present invention. In particular, Ni—Fe alloy of Fe being 15 to 55 wt % is preferably used in the present invention. Further, Ni—Fe alloy of Fe being 17 to 23 wt %, which can especially reduce a crystal magnetism anisotropic constant K, is more desirably used. A Fe content in Ni—Fe alloy can be adjusted by adjusting an ion ratio of Ni and Fe in a plating solution of the electroplating. Depending on this adjusting method, if variously changing an alloying composition, it is possible to determine the crystal magnetism anisotropic constant K at an optional value. Therefore, the frequency of the electromagnetic wave targeting at the absorption can be also changed to a desired value.

A plane shape, a thickness and an aspect ratio of the magnetic powder may be also appropriately determined in response to the frequency of the electromagnetic wave as a target of absorption. However, the plane shape of the magnetic powder is preferably circular or elliptical in shape without corners or regular polygonal in order to limit influences of diamagnetic field by a magnetization distribution to the minimum and to restrain a dispersion of magnetic resonance frequency by shape anisotropy. Further, the plane shape is especially preferably circular in shape.

The thickness of the magnetic powder is desirably below a skin depth depending on electric conductivity, permeability and frequency. In view of a space, the thickness above the skin depth is not useful for absorbing the electromagnetic wave. The skin depth is in proportion to $\rho/(\mu \cdot f)$ (in the formula $\rho$ is electric resistivity, $\mu$ is permeability and f is frequency). Referred to the formula (3), when f is equal to 1[GHz], the thickness of "skin depth" of the present invention becomes 1 $\mu$m($\rho=1\times10^{-7}$[$\Omega$m], $\mu_f$=30).

"$\mu_r$" is a relative magnetic permeability which is expressed with a formula (4).

[Formula 4:]

$$\mu_r=\mu/(4\pi\ 10^{-7}) \tag{4}$$

The aspect ratio (diameter/thickness) of the magnetic powder is preferably 10 to 200. If the aspect ratio is less than 10, an effect by increasing $HA_2$ is probably insufficient. Further, if it is more than 200, the diameter of the magnetic powder is large to be low electric resistance as a nature of metal and thereby to be easy in reflection of the electromagnetic wave. Therefore, an absorbing efficiency of the electromagnetic wave probably goes down.

The "diameter" referred herein is defined as a diameter of circle in the case of the disk-like magnetic powder being circular in plane, and in the case of the magnetic powder having a different plane than a circle such as the elliptical, regular polygonal planes, the diameter is defined as a diameter of the circle having a same area corresponding to an area demanded from the plane shape.

The average crystal grain diameter of the magnetic powder is preferably 100 nm or smaller. For the reasons as mentioned above.

[Production of Magnetic Powder]

For producing the magnetic powder by the electroplating, the plating mold is at first made by a photo-lithograph process through the following sequences. The plating mold is pattern-formed with an electrode range corresponding to the plane shape of the magnetic powder and an insulative range surrounding the periphery of the electrode range.

First, as shown in FIG. 1A, a resist layer 2 is formed on the surface of a metal substrate 1. A resist material to be the resist layer 2 includes a positive and a negative type resist material, and each of them may be employed. A portion of which the positive resist material is irradiated with an ultraviolet ray is dissolved by a developer, and the remaining portion is not dissolved. In reverse, a portion of which the negative resist material is irradiated with the ultraviolet ray is hardened and is not dissolved by the developer, and the remaining portion is dissolved. In the present example, the positive resist material is used.

Figure 1B:
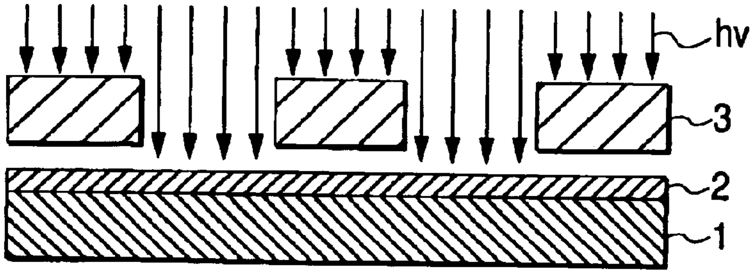

Next, as shown in FIG. 1B, photo-mask 3, which has patterns corresponding to the above-mentioned electrode range and insulative range, is disposed on the resist layer 2 in such a manner that it overlaps with a predetermined portion of the resist layer 2. Then a ray h ν such as the ultraviolet ray is irradiated on the resist layer 2 trough the photo-mask 3. In the case of this example, since the resist layer 2 is formed with the positive resist material, such a photo-mask 3 is used that the portion corresponding to the electrode range has a light transparency and another portion corresponding to the insulative range there around has a light shield. Further, for avoiding patterns from dazzling owing to light scattering, a parallel ray is used for the ray hν.

Figure 1C:
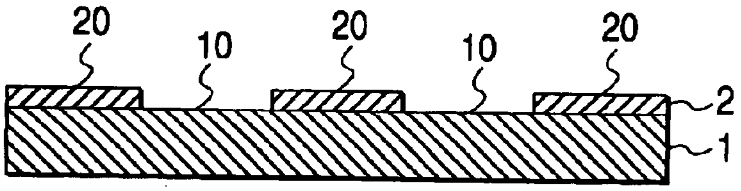

If the resist layer 2 is developed by the developer for the resist material, in response to the shape of the photo-mask 3, the portion of the resist layer 2, which is selectively irradiated with the ray, is dissolved and removed by the developer. Therefore, the surface of the metal substrate 1, which corresponds to the portion of the resist layer 2 selectively irradiated with the ray, is exposed. As shown in FIG. 1C, the exposed portion of the metal substrate 1 is to be the electrode range 10 corresponding to the plane shape of the magnetic powder (the shape is circular in the drawing). The surface of the resist layer 2, which is not dissolved, remains to be the insulative range 20 surrounding the periphery of the electrode range 10. Therefore, the plating mold M is produced.

In the plating mold M, the shape of the electrode range 10 is specified at a very high precision by the photo-lithograph process as mentioned above. Accordingly, the plane shape of the magnetic powder to be produced can be regulated at a very high precision.

The metal substrate 1 of the plating mold M may be formed with various kinds of metals. It is preferable to form the metal substrate 1 with the metals which are stable, and prevent the formed film from separating easily and the electrode range 10 from being corroded by the plating solution, in response to the kind of the magnetic material to be electroplated on the electrode range 10 and the composition of the plating solution. If possible, the metal substrate is preferably formed with the metals smaller in an ionization tendency than elements of the plating magnetic material.

On the surface of the metal substrate 1, a mold release layer may be formed for easily releasing the film from the mold. The mold release layer includes, for example, an oxidized film, a metal compound film, or a graphite powder coated film. Further, a passive film, which is formed when a metal is rolled and heat-treated, may be also utilized as a mold release layer. As needed, the passive film is formed chemically or electro-chemically to be a mold release layer. As an example of the passive film, a film of thiazole-based compound is taken up as a medicine for electrocasting.

The metal substrate 1 of the plating mold M is connected to a cathode (not shown) of a power source and a counter electrode (not shown) is connected to an anode of the power source. The plating mold M and the counter electrode are immersed in the plating solution prepared for forming the above-mentioned film of magnetic material and the electroplating is performed.

Figure 1D:
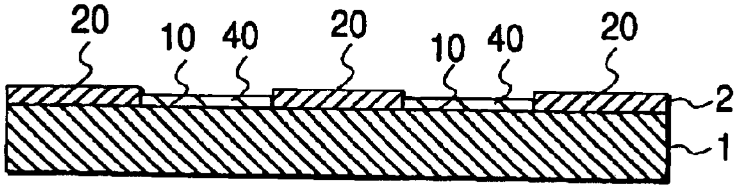

Then, as shown in FIG. 1D, the magnetic material of Ni—Fe alloy is precipitated selectively in the electrode range 10 of the plating mold M, and fine films 40 are many formed in response to the shape of the electrode range 10.

Figure 1E:
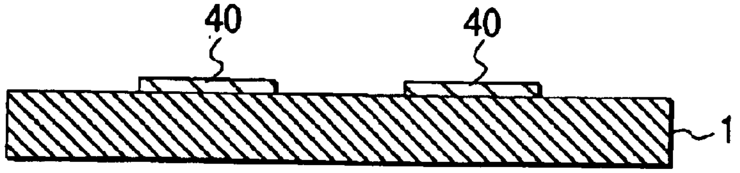

As seen in FIG. 1E, the resist layer 2 is removed. Caustic soda, acetone or the like may be used for removing the resist layer, but it depends on the types of the resist material.

Figure 1F:
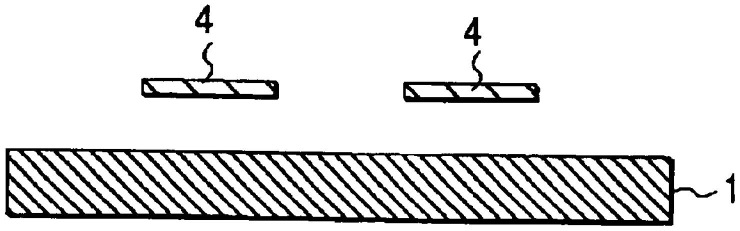

As in FIG. 1F, the films 40 are rubbed with, e.g., a rotary brush (not shown), or are removed by applying a rubber roller from the surface or the metal substrate 1. Thus, many and line magnetic powders 4 are produced.

In another case, the magnetic powder, which includes the metallic soft magnetic material, is flat in shape as mentioned above. Further, the average crystal grain diameter thereof is 100 nm or smaller.

The reason why the average crystal grain diameter is limited in the above mentioned range is as aforementioned. For increasing $\mu''$ of the electromagnetic wave absorbent in the high frequency band, the average crystal grain diameter is preferably 50 nm or smaller.

Further, the average crystal grain diameter is preferably 10 nm or larger. If it is less than this range, the magnetic powder is brittle and breakable when mixing with resins.

It is desirable that the magnetic powder is formed to be flat having the plane shape such as circular, elliptical, or regular polygonal. The suitable dimensions, that is, the thickness or the aspect ratio are as mentioned above.

As the metallic soft magnetic material for forming the magnetic powder, for example, are (a) any one kind of metals of Ni, Fe or Co, otherwise (b) an alloy of two kinds or more of metals including at least one kind of said metals. Further, as the alloy of (b), there are listed an alloy comprising only two kinds or three kinds of Ni, Fe or Co, and an alloy including one to three kinds of Ni, Fe or Co and other metals.

In particular, Ni—Fe alloy exhibits a most excellent soft magnetic property among the metallic soft magnetic materials, and is also desirably employed in the invention.

It is preferable to use the Ni—Fe alloy including Fe 15 to 55 wt %. Further, such Ni—Fe alloys including Fe 17 to 23 wt % are most suitably used among them, since it enables to reduce the crystal magnetic anisotropic constant K owing to a metallic structure.

[Production of Magnetic Powder]

The magnetic powder is preferably produced by the electroplating as mentioned above.

The magnetic powder is produced by use of a plating mold which is pattern-formed with an electrode range corresponding to the shape of the magnetic powder and an insulative range surrounding the periphery of the electrode range, precipitating films of the magnetic material selectively in the electrode range through an electroplating with a cathode of the electrode range, and then peeling the films from the plating mold.

At this time, if organic additives are supplied into a plating liquid for controlling sizes of crystal grains, it is possible to adjust the average crystal grain diameter within the above mentioned range.

That is, the organic additives are dissolved during precipitating reaction of the film through the electroplating and adsorbed at a crystal growth point, whereby the organic additive restrains a further growth of the crystal grain, so that crystal grain diameter can be reduced.

As such organic additives, there are a first brightening agent and a second brightening agent for effecting brightness to the plated film in a known plating.

The first brightening agent includes the organic compound having=C-$SO_2$—in the structure thereof and is in forms of sulfonic acid, sulfonate, sulfinic acid, sulfonamide, and sulfonimide, and in particular, 1,5-naphthalendisulfonic acid sodium, 1,3,6-naphthalentrisulfonic acid sodium, saccharin, (orthobenzen sulfonimide), and paratoluene sulfonamide are suitably employed.

The second brightening agent includes, for example, 2-butyne-1,4diol, propargyl alcohol, coumalin, ethylene cyanohydrin.

These agents may be used in simplex or co-use of two kinds or more. The first and second brightening agents are preferably used together only for brightness, but for the purpose of controlling the crystal grain diameter as the invention, any one of them or two kinds or more may be used.

When the organic additives are supplied, the magnetic powder includes elements originated by said additives, for example, P, S, C and others. However, There is no possibility to largely lose the magnetic property since the total amount is around 0.5 wt %.

In case the magnetic powder is formed with an alloy of two kinds or more of metals, if precipitating the metals of two kinds or more, the average crystal grain diameter can be adjusted within said range. For example, the Ni—Fe alloy is a typical example.

Further, for another example of the alloy, it may be produced with not only the alloy including the metal of two or three kinds of Ni, Fe or Co such as the Ni—Fe alloy but also an alloy comprising one to three kinds of metals among Ni, Fe or Co and other metals only to form the alloy with. But for this case, in view of the magnetic property of the magnetic powder, other metals except for Ni, Fe and Co are preferably selected.

In the electroplating method, it is easy to produce the flat magnetic powder of the average crystal grain diameter being 100 nm or smaller.

However, the production of the magnetic powder is not limited to the only electroplating method.

The crystal grain diameter produced by a grain refining method (a cold rolling, or rapidly solidifying) usually and often carried out is, even small, around 1 μm at the present situation. But in recent years, various techniques have been investigated as to refining of the crystal grain. If there is any of these techniques applicable to the flat magnetic powder, similar effects can be expected.

The average crystal grain diameter of the magnetic powder available by deforming ball-like powders to be flat through the water atomizer is 200 to 500 nm. The sizes are not too fine, but in the future, if a technique of refining crystal grains of these powders is developed, an improvement of the high frequency can be expected.

Moreover, in a vapor growth process as a vacuum evaporation and a sputtering process, if speeding up an evaporation or cooling a base of evaporating the thin film originating the magnetic powder, it may be considered to refine crystal grains to some extent. Therefore, if a technique is employed for adjusting the crystal grains to be within the above mentioned ranges, similar effects can be expected.

[Resin]

All insulative resins functioning as the bonding agent are usable as resins, which is included in the electromagnetic wave absorbing material together with any of the above mentioned magnetic powders. Taking into consideration the function as the bonding agent particularly, the insularity and the formability forming the electromagnetic wave absorbing materials into various shapes in combination, for example, there are preferably enumerated, the example, styrene based resins such as acrylonitrile-styrene butadiene copolymer (ABS) and acrylonitrile-styrene copolymer, polyester based resins such as polyethylene terephthalate resin, olefin based resins such as polycarbonate resin, polyethylene, polypropylene and chlorinated polyethylene, cellulose based resin, polychloride vinyl based resin, and thermoplastic resins such as polyvinyl butyral resin.

[Electromagnetic Wave Absorbent]

The electromagnetic wave absorbent is produced by dispersing the magnetic powders into the resins.

Specifically, the magnetic powders and resin are mixed at a predetermined ratio, heated to soften or melt the resins, and kneaded, to thereby form into desired shapes by, e.g., an extruder. Thus, the electromagnetic wave absorbent is produced.

In kneading and forming, for preventing the crystal grains from increasing by the heating history, it is desirable to carry out the work at low temperatures of higher than that of softening or melting the resin and for a short period. As specific conditions therefor, since the crystal grain rapidly grows by heating of 300° C.×60 min, it is preferable that the kneading temperature is 200° C. or lower and the kneading time is 60 minutes or shorter.

Further, for the extruding formation, it is preferable to carry out the kneading under the above mentioned conditions within the extruder, followed by immediately operating the extruding formation.

A space factor of the magnetic powder in the thus produced electromagnetic wave absorbent is preferably 15 to 50 vol %.

If it is less than 15 vol %, a sufficient electromagnetic wave absorbing effect is not probably obtained. Reversely, if it is more than 50 vol %, the rate of the resin as the bonding agent is relatively decreased, and the strength or the formability of the electromagnetic wave absorbent is probably lowered.

Next, the embodiment according to the invention will be explained in accordance with a non-limiting example and comparative examples.

<Making of the Plating Mold>

A stainless steel sheet was processed as the metal substrate 1 by a production method using the above mentioned photo-lithograph process, and the plating mold M including the circular electrode range 10 was made as shown in FIG. 1.

The positive resist material is coated 3 μm or more on one surface of the stainless steel sheet so that the resist layer 2 is formed. Next, this resist layer 2 was exposed by the ultraviolet ray through the photo-masks 3 and developed by an exclusive developer for the resist material. By this development, the plating mold M was produced with lots of electrode range 10 in response to the shape of the magnetic powder and the insulative range surrounding the electrode range 10. The electrode range 10 was the surface of the metal substrate 1 exposed to the circles of 20 μm diameter. The insulative range 20 was the surface of the resist layer, which was not removed and remains.

Production of the Magnetic Powder

The Ni—Fe alloying powders shaped in disc as the magnetic powders 4 were much produced through the following procedure by use of the plating mold M.

The plating solution of the under mentioned composition was prepared.

| (Components) | (Density) |
|---|---|
| Nickel sulfate hexahydrate | 100 g/L |
| Nickel chloride hexahydrate | 60 g/L |
| Boric acid | 30 g/L |
| Iron (II) sulfate heptahydrate | 8 g/L |
| Natrium gluconate | 20 g/L |
| Saccharin | 4 g/L |

The above plating solution was poured into the plating vessel, and adjusted to be pH 3 and 60° C. the bath temperature, and the plating mold M and the counterelectrode were immersed in the solution causing a nitrogen gas bubbling. For the counter electrode, a titanium made anode case filled with nickel tips and iron tips was used.

The electroplating was performed under the current density 10A/dm$^2$, and the Ni—Fe alloy film was formed as the film 40 of magnetic material on the surface of the electrode range 10 of the plating mold M.

Subsequently, the plating mold M was taken out from the plating vessel, washed with acetone to remove the resist layer 2, and thereby to form the film 40 on the electrode range 10. Thus the film 40 was peeled no as to recover Ni—Fe alloy powder as the magnetic powder 4.

The recovered Ni—Fe alloy powders were discs of 20 μm diameter and 0.5 μm thickness corresponding to the plane shape of the electrode range 10 and were regular with respect to the plane shape and the thickness. The alloying composition had Fe content being 20 wt %, S content being 0.02 wt %, and C being 0.01 wt %.

<Electromagnetic Wave Absorbent>

The magnetic powder and chlorinated polyethylene as the resin were mixed such that the space factor of the magnetic powder would be 35 vol %, and molten and mixed at 150° C. for 30 minutes, followed by immediately extruding to form a sheet of 2 mm thickness.

The magnetic powder included in the produced sheet was taken out and observed by a scanning electron microscope and a transmission electron microscope, and it was confirmed that the average crystal grain diameter was 30 nm.

COMPARATIVE EXAMPLE 1

Ni—Fe alloy powder including Fe20 wt % being produced by an atomizer process was mechanically pulverized, elongated and torn by use of an atoliter to produce flat flake like magnetic powder of diameter being 5 to 100 $\mu$m (average diameter: 20 $\mu$m), and thickness being 0.5 $\mu$m.

The sheet of 2 mm thickness was produced by the extrusion forming in the same manner as Example 1 except for the use of the above magnetic powder.

COMPARATIVE EXAMPLE 2

Targeting at Ni—Fe alloy of Fe content being 20 wt %, the Ni—Fe alloy film of 0.5 $\mu$m was formed on the substrate. Then, the resist layer was formed on this film surface, many circles of 20 $\mu$m diameter were subjected to sputtering to form mask patterns, and unnecessary pans were removed by etching from Ni—Fe alloy film. The film is separated from the substrate, and the magnetic powders of 20 $\mu$m diameter and 0.5 $\mu$m thickness were produced, and the products were uniform in diameter and thickness.

The sheet of 2 mm thickness was produced by the extrusion forming in the same manner as Example 1 except for the use of the above magnetic powder.

In observing the magnetic powder taken out from the produced sheet by the scanning electron microscope or the transmission electron microscope, the average crystal grain diameter was 1.0 $\mu$m.

Figure 2:
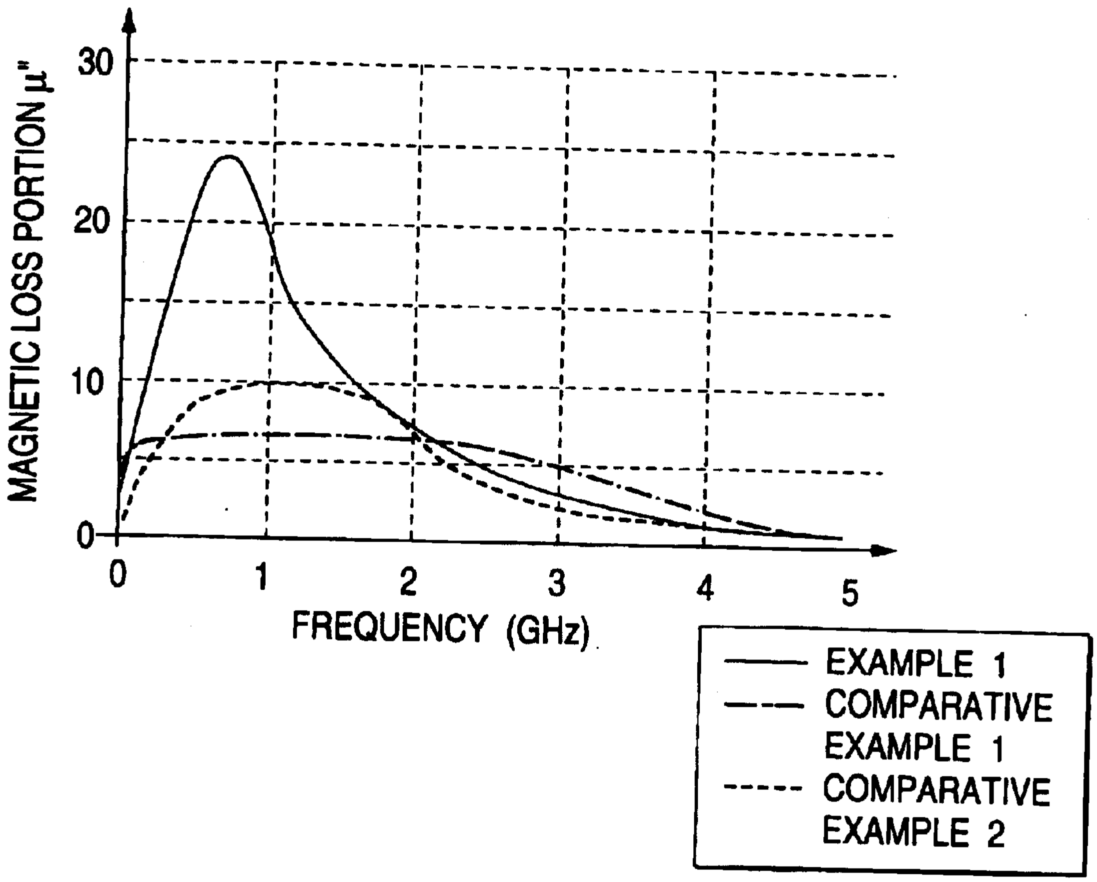
FIG. 2 is a graph showing the relationship between the frequency and the magnetism loss portion $\mu''$ in the electromagnetic wave absorbent produced in Example and Comparative examples.

The relationship between the frequency and the magnetism loss portion $\mu$" of the sheets, which was obtained in Example 1, Comparative examples 1, and 2, were measured by a coaxial wave guide process by use of a network analyzer. The results are shown in FIG. 2.

Seeing from the drawing, it is confirmed that Example 1 has an acute peak of the specific frequency in comparison with Comparative examples 1 and 2. Therefore, Example 1 has the large magnetism loss portion $\mu$" of this peak and was a good electromagnetic wave absorption.

COMPARATIVE EXAMPLE 3

The magnetic powder produced in Example 1 is heat-treated at 300° C. for 60 minutes for producing a sheet of 2 mm thickness in the same manner as Example 1.

The magnetic powder contained in the produced sheet was taken out and observed by the scanning electron microscope and the transmission electron microscope, and it was confirmed that the average crystal grain diameter was 320 nm.

Figure 3:
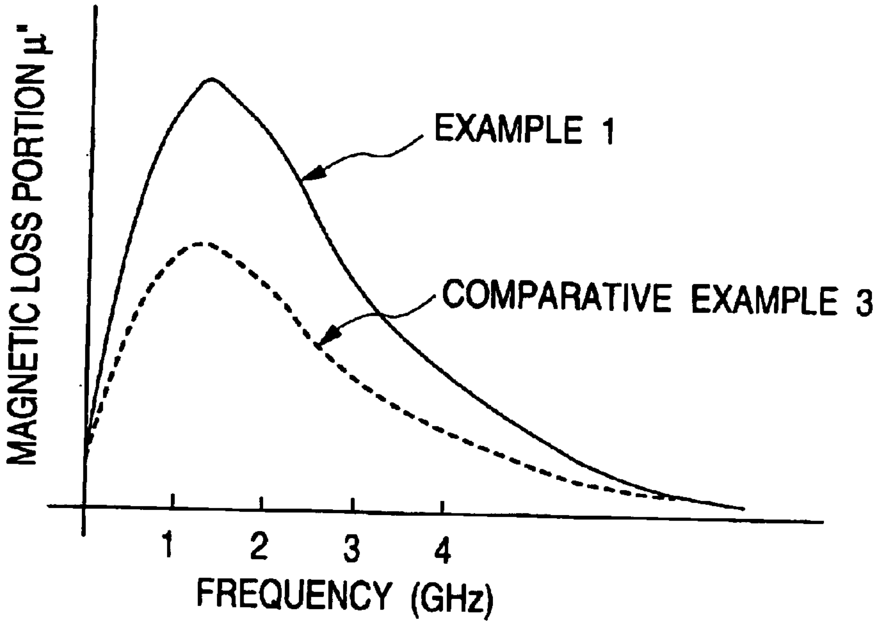
FIG. 3 is a graph showing the relationship between the frequency and the magnetism loss portion $\mu''$ in the sheets made of the electromagnetic wave absorbing material produced in Example and Comparative Example 3.
Figure 4A:
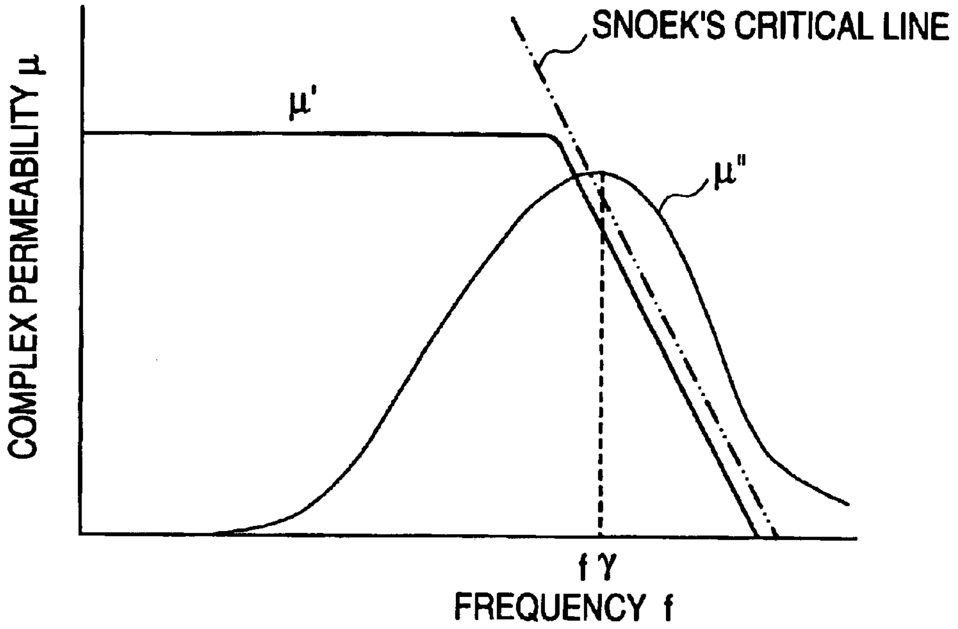
FIG. 4A is a graph showing the relationship between the frequency and the complex permeability $\mu$ in the conventional spinel type ferrite based material.
Figure 4B:
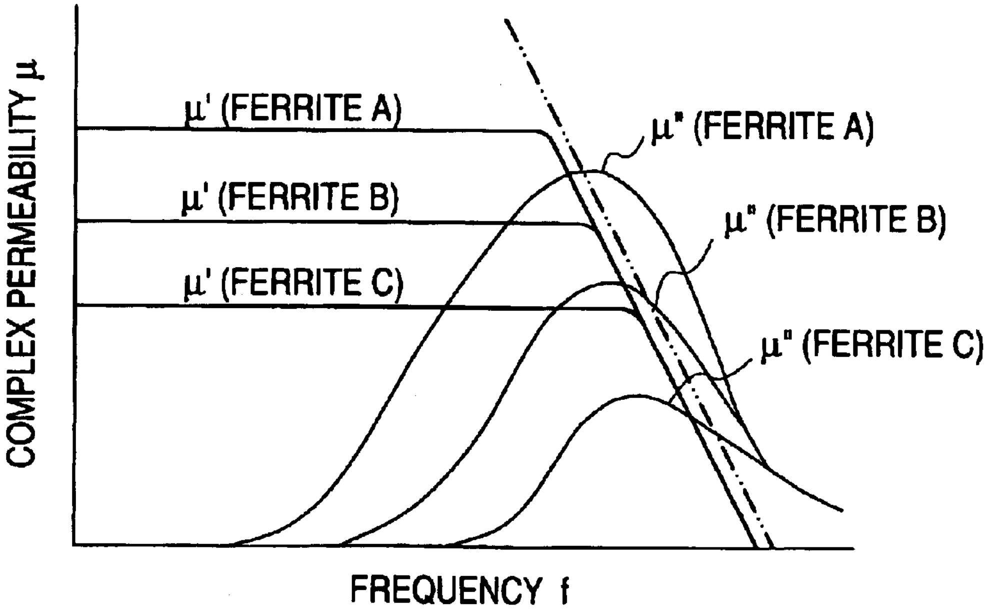
FIG. 4B is a graph showing changes in the electromagnetic wave absorbing property of the spinel type ferrite based material.

The relationship between the frequency and the magnetism loss portion $\mu$" of the sheets obtained in Example 1 and Comparative Example 3 was measured by a coaxial wave guide process by use of a network analyzer. Results are shown in FIG. 3.

From the drawing, it is confirmed that Example 1 had a peak of $\mu$" being larger by 1.5 times than that of Comparative Example 3 with respect to the specific frequency and caused a good electromagnetic wave absorption.

What is claimed is:

1. An electromagnetic wave absorbent comprising:

an insulative resin operable as a bonding agent;

a plurality of magnetic powders dispersed into a insulative resin, the magnetic powders having substantially a predetermined plane shape and predetermined thickness, wherein a thickness of each of the magnetic powders is within a range of ±15% of the predetermined thickness, a thickness of any portion of each of the magnetic powders is within a range of ±10% or the predetermined thickness, and an area of the plane shape of each of the magnetic powders within a range of ±10%.

2. The electromagnetic wave absorbent according to claim 1, wherein each of the magnetic powders comprises Ni—Fe alloy containing Fe 17 to 55 wt %.

3. The electromagnetic wave absorbent according to claim 2, wherein each of the magnetic powders comprises Ni—Fe alloy containing Fe 17 to 23 wt %.

4. The electromagnetic wave absorbent according to claim 1, wherein the magnetic powders comprise metallic soft magnetic material.

5. The electromagnetic wave absorbent according to claim 1, wherein the plane shape of the magnetic powders is circular.

6. The electromagnetic wave absorbent according to claim 1, wherein the plane shape of magnetic powders is elliptical.

7. The electromagnetic wave absorbent according to claim 1, wherein a space factor of the magnetic powders in the electromagnetic wave absorbent is within a range of 15 to 40 vol %.

8. The electromagnetic wave absorbent according to claim 1, wherein average crystal grain diameters of the magnetic 100 cm or smaller.

9. The electromagnetic wave absorbent according to claim 1, wherein each of the magnetic powders are flat in shape.

10. The electromagnetic wave absorbent according to claim 1, wherein the magnetic powders are formed with any one kind of metals Ni, Fe and Co, and at least one kind of P, S and C.

11. The electromagnetic wave absorbent according to claim 1, wherein the magnetic powders are formed with an alloy of two kinds or more of metals including at least one kind of Ni, Fe and Co, and at least one kind of P, S and C.

12. The electromagnetic wave absorbent according to claim 1, wherein the magnetic powders are simultaneously formed with an alloy of two kinds or more of metals including at least one kind of Ni, Fe an Co by the electroplating.

13. A method for producing magnetic powders for an electromagnetic wave absorbent, wherein the magnetic powders are dispersed into an insulative resin, comprising the steps of:

preparing a plating mold pattern formed with an electrode range corresponding to a predetermined plane shape of the magnetic powders, and an insulative range surrounding a periphery of the electrode range;

precipitating a film in the electrode range through electroplating using the plating mold, wherein the electrode range acts as a cathode; and peeling the magnetic film from the plating mold to obtain the magnetic powders.

14. The method for producing magnetic powders for an electromagnetic wave absorbent according to claim 13, wherein the process further comprises the steps of: dispersing the obtained magnetic powders into an insulative resin and mixing; and extruding the mixed insulative resin and magnetic powders.

15. The method for producing magnetic powders for an electromagnetic wave absorbent according to claim 13, wherein the process further comprises the steps of: adding organic additives in a plating liquid used by the electroplating of the magnetic material for controlling a size of a crystal grain in the magnetic film.

16. The method for producing the magnetic powders according to claim 13, wherein each of the magnetic powders comprises metallic soft magnetic material.

17. An electromagnetic wave absorbent comprising:

an insulative resin operable as a bonding agent; and a plurality of magnetic powders dispersed into the insulative resin, the magnetic powders having substantially a predetermined plane shape and predetermined thickness, wherein a thickness of each of the magnetic powders is within a range of ±15% of the predetermined thickness, a thickness of any portion of each of the magnetic powders is within a range of ±10% of the predetermined thickness, and an area of the plane shape of each or the magnetic powders is within a range of ±10% therebetween, the electromagnetic wave absorbent manufactured by a process comprising the steps of:

preparing a plating mold pattern formed with an electrode range corresponding to a predetermined plane shape of the magnetic powders, and an insulative range surrounding a periphery of the electrode range;

precipitating a film in the electrode range through electroplating using the plating mold, wherein the electrode range acts as a cathode; and peeling the magnetic film from the plating mold to obtain the magnetic powders.

18. The electromagnetic wave absorbent comprising according claim 17, wherein the process further comprises the steps of:

dispersing the obtained magnetic powders into an insulative resin and mixing; and extruding the mixed insulative resin and magnetic powders.

19. The electromagnetic wave absorbent comprising according to claim 17, wherein the process further comprises the steps of:

adding organic additives in a plating liquid used by the electroplating of the magnetic material for controlling a size of a crystal grain in the magnetic film.

20. The method for producing the magnetic powders according to claim 17, wherein each of the magnetic powders comprises metallic soft magnetic material.

21. The electromagnetic wave absorbent according to claim 17, wherein the magnetic powders are formed with any one kind of metals Ni, Fe and Co, and at least one kind of P, S and C.

22. The electromagnetic wave absorbent according to claim 17, wherein the magnetic powders are formed with an alloy of two kinds or more of metals including at least one kinds of Ni, Fe and Co, and at least one kind of P, S and C.

23. The electromagnetic wave absorbent according to claim 17, wherein the magnetic powders is simultaneously formed with an alloy of two kinds or mace of metals including at least rind of Ni, Fe and Co by the electroplating.

24. The electromagnetic wave absorbent according to claim 17, wherein each of the magnolia powders comprises Ni—Fe alloy including Fe 15 to 55 wt %.

* * * * *